United States Patent [19]
Ferguson et al.

[11] Patent Number: 5,576,962
[45] Date of Patent: Nov. 19, 1996

[54] CONTROL SYSTEM AND METHOD FOR A HYDROSTATIC DRIVE SYSTEM

[75] Inventors: Alan L. Ferguson; Conrad G. Grembowicz; Larry E. Kendrick, all of Peoria, Ill.

[73] Assignee: Caterpillar Inc., Peoria, Ill.

[21] Appl. No.: 619,270

[22] Filed: Mar. 18, 1996

Related U.S. Application Data

[63] Continuation of Ser. No. 405,339, Mar. 16, 1995, abandoned.

[51] Int. Cl.$^6$ .............................. B60K 41/16; F04B 49/00
[52] U.S. Cl. .................. 364/431.03; 364/431.07; 364/424.07; 417/34; 417/53; 60/431; 60/445; 60/449
[58] Field of Search ................ 364/431.03, 431.07, 364/431.04, 431.12, 424.07, 426.01; 60/431, 434, 445, 448, 449; 417/34, 53, 216

[56] References Cited

U.S. PATENT DOCUMENTS

| | | | |
|---|---|---|---|
| 4,180,979 | 1/1980 | Cornell | 60/395 |
| 4,194,362 | 3/1980 | Nonnenmacher | 60/431 |
| 4,395,199 | 7/1983 | Izumi et al. | 417/53 |
| 4,400,935 | 8/1983 | Louis | 60/431 |
| 4,523,892 | 6/1985 | Mitchell et al. | 417/34 |
| 4,534,707 | 8/1985 | Mitchell | 417/34 |
| 4,596,118 | 6/1986 | Heiser | 60/431 |
| 4,696,380 | 9/1987 | Kita | 192/4 A |
| 4,741,159 | 5/1988 | Gunda et al. | 60/443 |
| 4,904,161 | 2/1990 | Kamide et al. | 417/22 |
| 4,914,592 | 4/1990 | Callahan et al. | 364/424 |
| 5,040,119 | 8/1991 | Hardy et al. | 364/424.07 |
| 5,117,632 | 6/1992 | Strenzke | 60/327 |
| 5,182,908 | 2/1993 | Devier et al. | 60/420 |
| 5,214,916 | 6/1993 | Lukick | 60/431 |
| 5,390,759 | 2/1995 | Gollner | 180/307 |

*Primary Examiner*—Kevin J. Teska
*Assistant Examiner*—Tan Nguyen
*Attorney, Agent, or Firm*—Mario J. Donato; David M. Masterson

[57] ABSTRACT

An apparatus for controlling the load of an engine associated with an hydrostatic drive system is disclosed. The apparatus modifies a pump displacement command signal in response to the actual and desired engine acceleration. The modified pump displacement command signal is used to control the displacement of a variable pump in order to regulate the load on the engine to achieve optimum efficiency.

4 Claims, 5 Drawing Sheets

|  | LARGE NEGATIVE | SMALL NEGATIVE | SMALL POSITIVE | SMALL POSITIVE |
|---|---|---|---|---|
| POSITIVE ACCELERATION | MODERATE POSITIVE DROC | NULL DROC | NULL DROC | MODERATE NEGATIVE DROC |
| NEGATIVE ACCELERATION | LARGE POSITIVE DROC | NULL DROC | NULL DROC | MODERATE NEGATIVE DROC |

ENGINE SPEED ERROR

AROC

CONTROL SYSTEM AND METHOD FOR A HYDROSTATIC DRIVE SYSTEM

This is a file wrapper continuation of application Ser. No. 08/405,339, filed Mar. 16, 1995, now abandoned.

TECHNICAL FIELD

This invention relates generally to a control system and method for a hydrostatic drive system that includes an internal combustion engine and a variable displacement hydraulic pump.

BACKGROUND ART

Many machines, particularly earth working machines, use a hydrostatic drive system to drive the traction wheels or tracks of the machine. Frequently, the prime mover engine of the machine is set to operate at a predetermined speed via an engine throttle. The machine speed can then be regulated by controlling the displacement of one of the hydraulic elements of the hydrostatic drive system, without adjusting the engine throttle.

One problem common to many known hydrostatic drive systems is that operation of the hydraulic elements produce loads on the engine that causes engine "stalling" or "lugging", a.k.a., excessive engine speed droop; thereby causing the decreased productivity of the machine. For most machines, the operator is required to control the engine load manually by controlling the displacement of the hydraulic elements. However, this is tedious and often difficult. For other machines, electronic controllers are used to control the displacement of the hydraulic elements in response to engine speed. However, many of such systems become unstable because the time required to make necessary adjustments to the hydraulic elements is much greater than the time necessary to generate a command signal in response to changes in engine speed.

The present invention is directed to overcoming one or more of the problems as set forth above.

DISCLOSURE OF THE INVENTION

An apparatus for controlling the load of an engine associated with an hydrostatic drive system is disclosed. The apparatus modifies a pump displacement command signal in response to the actual and desired engine speed acceleration. The modified pump displacement command signal is used to control the displacement of a variable pump in order to regulate the load on the engine to achieve optimum efficiency.

BRIEF DESCRIPTION OF THE DRAWINGS

For a better understanding of the present invention, reference may be made to the accompanying drawings in which:

FIG. 4 illustrates a control maps associated with the load control method; and

BEST MODE FOR CARRYING OUT THE INVENTION

Figure 1:
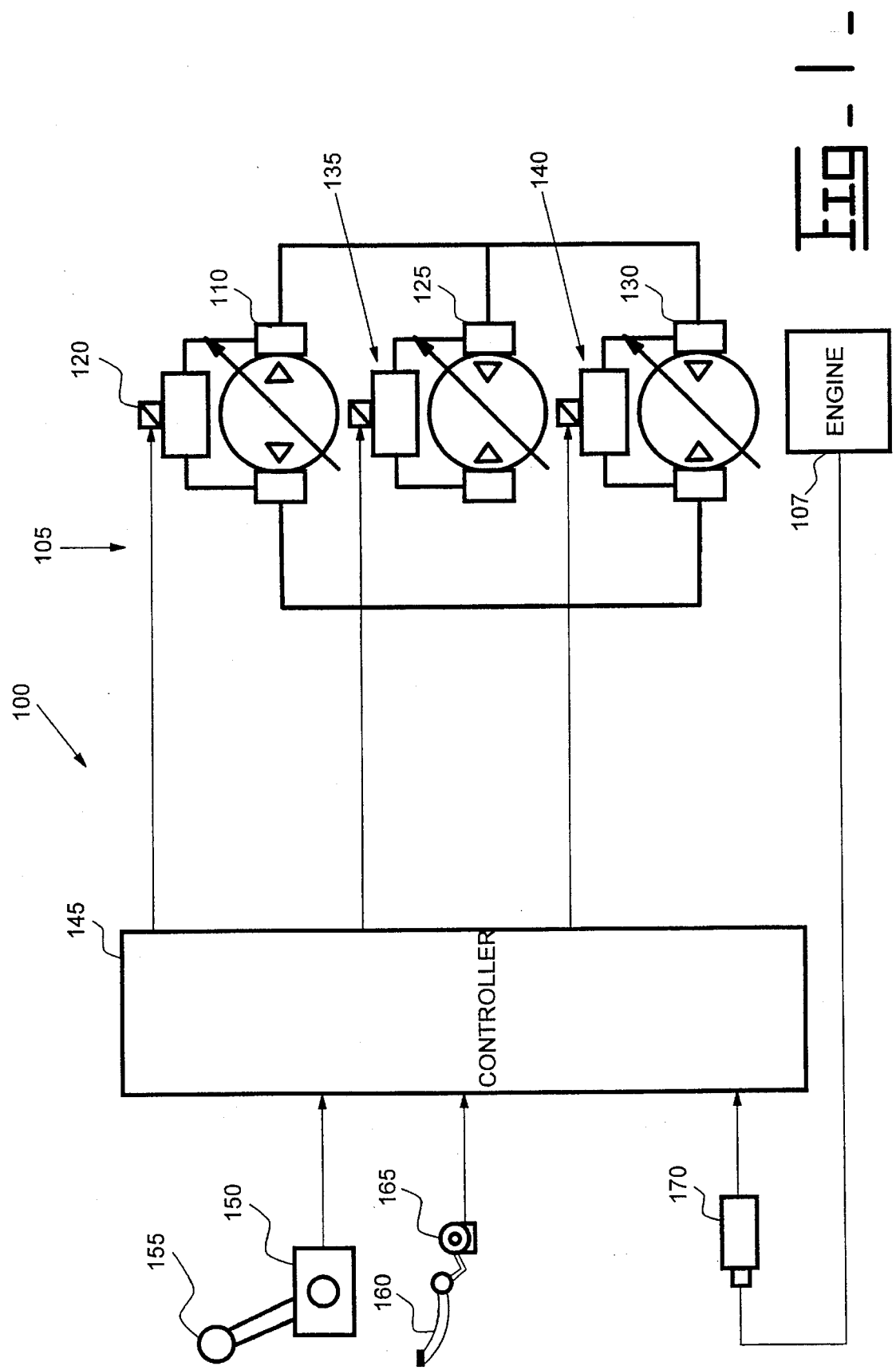
FIG. 1 illustrates a hydrostatic drive system, engine, and hydraulic pump and motor arrangement.

Referring now to the drawings, FIG. 1 illustrates an electronic control system 100 for an hydrostatic drive system 105. The hydrostatic drive system 105 includes a prime mover 107, preferably an internal combustion engine, that drives a variable displacement hydraulic pump 110. The swashplate of the pump 110 is actuable by a displacement solenoid 120. Preferably, the pump 110 includes a directional solenoid 120 that controls the pump's output flow direction, i.e., either forward or reverse. The pump 110 provides high pressure fluid to two parallel connected variable displacement motors 125,130. Each motor includes a displacement solenoid 135,140 that is used to actuate the swashplate of the respective motors 125,130. The motors 125,130 are used to provide the necessary torque in order to propel the machine. Although a single pump is shown, it will be apparent to those skilled in the art that the present invention will equally be applicable to multiple pump and motor arrangements.

The electronic control system 100 includes a microprocessor based controller 145 that includes system memory. The controller 145 receives various sensing signals and controls the displacement of the pump 110 and motors 125,130. A propel lever 155 may be provided for the operator to set a desired travel speed of the machine. Accordingly, a propel lever sensor 150 produces a desired travel speed signal in response to the relative position of the propel lever 155. Although a lever is shown, it will become apparent to those skilled in the art that dials, switches, or the like may equally be used. Further, a brake pedal 160 may be provided for the operator to "quickly" slow the machine. Accordingly, a brake pedal position sensor 165 produces an attenuation signal in response to the relative position of the brake pedal 160.

The controller 145 receives the desired travel speed and attenuation signal, and produces a desired pump command signal. An engine speed sensor 170 produces a signal in response to the rotational speed of the engine 107. The controller 145 receives the actual engine speed signal, compares the actual engine speed signal magnitude to a desired engine speed that is preprogrammed in system memory, and modifies the desired pump command signal, if necessary, to prevent excessive engine speed droop. Note, it is assumed that the engine 107 is set at maximum throttle.

The controller 145 utilizes arithmetic units to control various processes according to software programs. Typically, the programs are stored in read-only memory, random-access memory or the like. One such process is an optimal load control method that is discussed in relation to various block diagrams addressed below.

Figure 2:
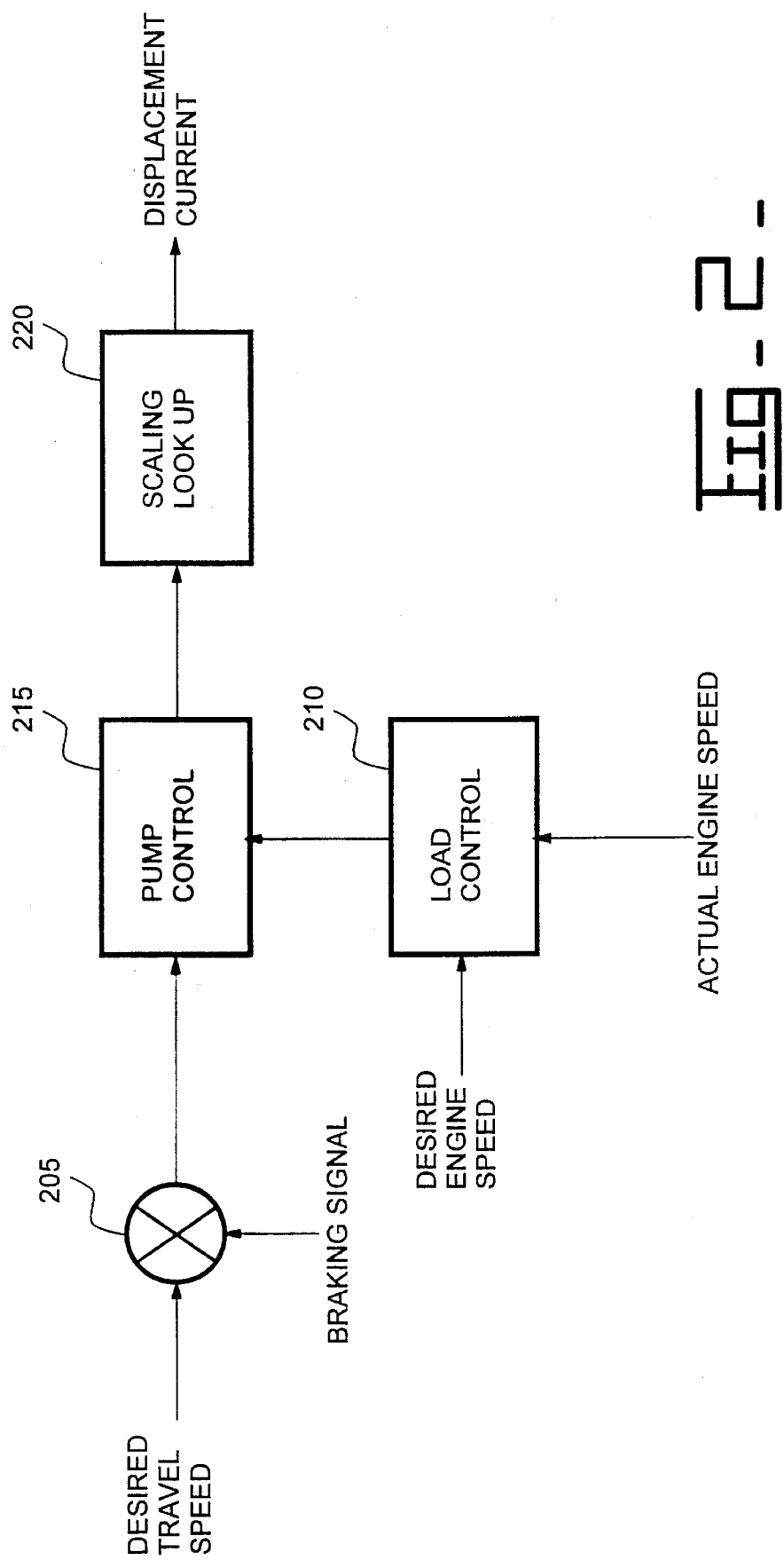
FIG. 2 illustrates a high level block diagram of a load control method for controlling the hydraulic pump displacement.

Referring now to FIG. 2, a high level block diagram of the optimal load control method 200 is shown. A multiplication block 205 receives the desired travel speed and attenuation signals, and produces a desired pump command signal in response to the product between the desired travel speed and attenuation signal magnitudes. A load control block 210 receives the actual and desired engine speed, and determines a load control coefficient, $K_{UF}$, that is responsive to the difference between the actual and desired engine speed. A pump control block 215 receives the desired pump command signal and load control coefficient, and modifies the desired pump command signal. More specifically, the desired pump command signal magnitude is multiplied by the load control coefficient, $K_{UF}$, at the pump control block 215. A software table look-up routine 220 receives the magnitude of the command signal and retrieves a current magnitude that will be used to control the pump displacement via solenoid 120. Because the pump displacement directly effects the engine load, the engine speed may thus be regulated by controlling the pump displacement. Consequently, in response to detecting the engine "stalling" or "lugging", the pump controller destrokes the pump to reduce engine load and allow the engine to return to the desired speed.

Figure 3:
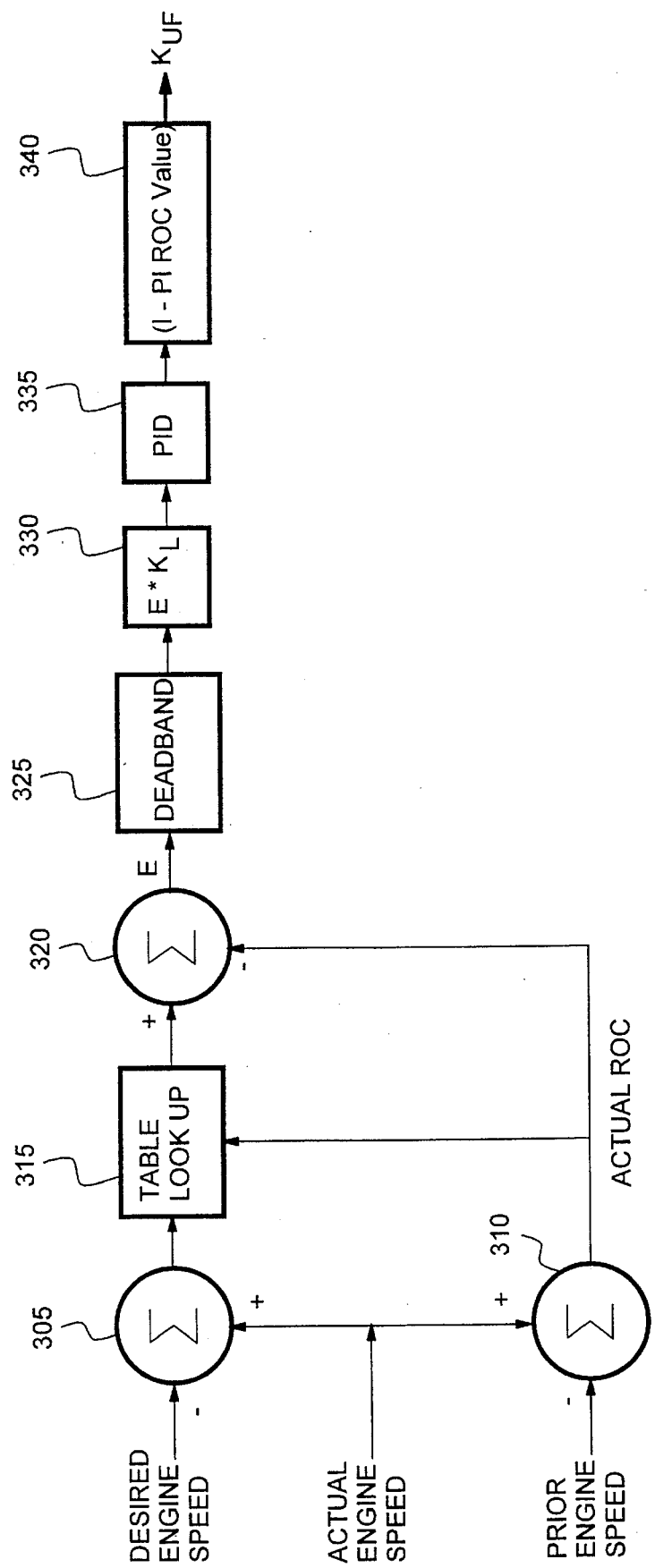
FIG. 3 illustrates a lower level block diagram of the load control method.
Figure 5:
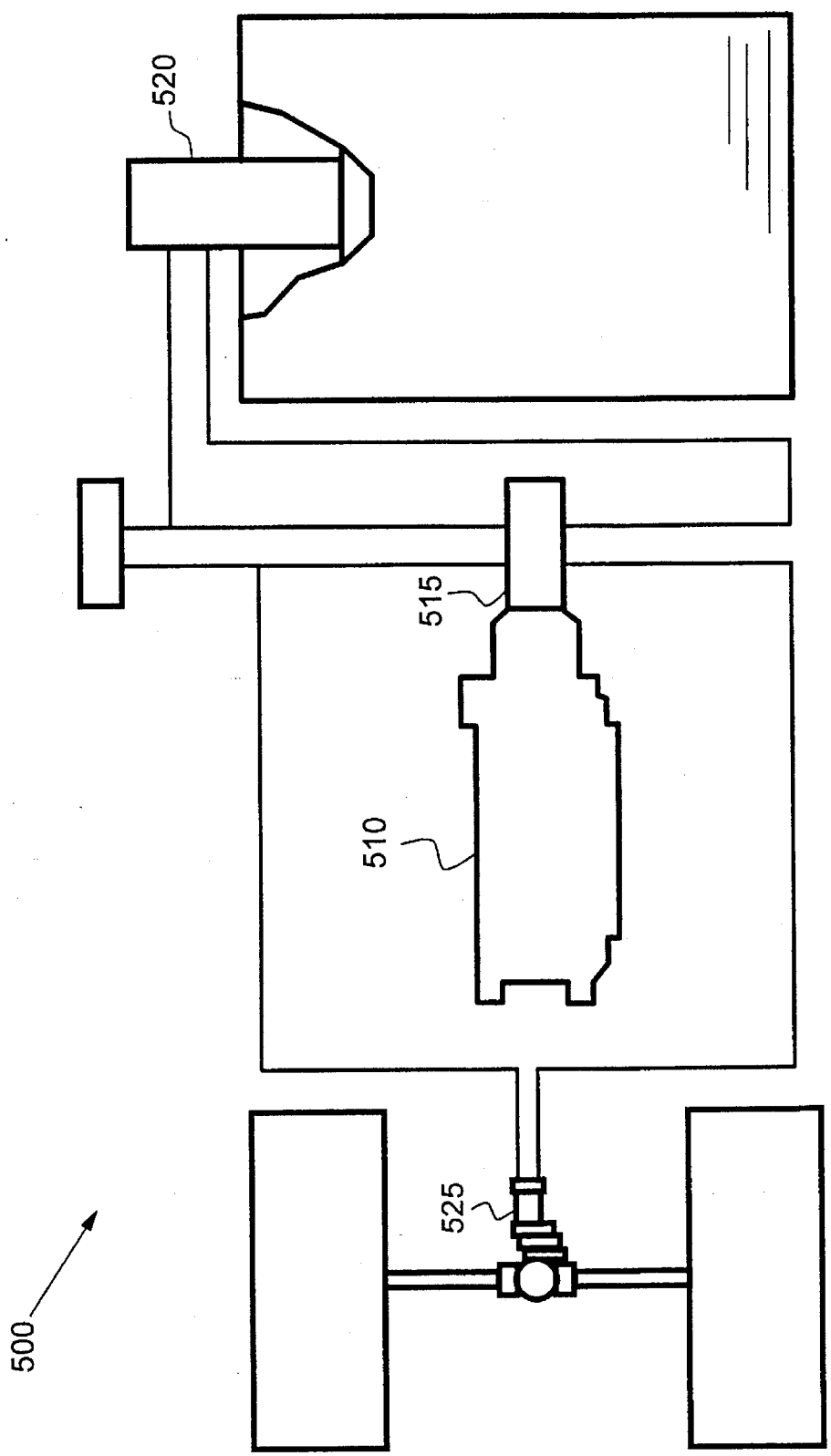
FIG. 5 illustrates a hydrostatic drive system associated with a vibratory soil compactor.

Operation of the load control block 210 is illustrated in the block diagrams shown in FIGS. 3–5. Referring now to FIG. 3, summer 305 receives the desired and actual engine speed signals and produces a speed error signal. Meanwhile, summer 310 receives a prior engine speed signal and the actual engine speed signal, and produces an actual rate-of-change (AROC) signal. The prior engine speed signal is associated with the sensed engine speed associated with the last iteration of the control loop. Note that, the value of the actual ROC signal indicates whether the engine is accelerating or decelerating.

The speed error and the AROC signals are delivered to a software table look-up routine 315. The table look-up routine responsively produces a desired rate-of-change (DROC) signal. One example of a software look-up table is shown with reference to FIG. 4. For each value of the speed error signal and AROC signal, DROC signal is shown.

In this example, only large speed errors will produce a DROC signal having a non-zero magnitude. For example, a large positive speed error indicates that the engine load should increase because the engine has available power due to the relatively high engine speed (the actual engine speed is greater than the desired engine speed). Consequently, a large positive speed error signal causes the table look-up to retrieve a DROC value having a predetermined negative value. The negative value causes the pump displacement to increase; thereby, increasing the load on the engine.

In contrast, a large negative speed error value indicates that the engine load should decrease because the load is causing the engine to "stall" or "lug". Consequently, a negative speed error signal causes the table look-up to retrieve a DROC value having a predetermined positive value. The positive value indicates that the pump displacement is to decrease; thereby, reducing the load on the engine.

Otherwise, a small speed error signal causes the table look-up to retrieve a DROC value having a "null" or zero value. A zero value has no effect on the pump displacement.

Note that, the table shown in FIG. 4 is just one example of such a look-up table.

Adverting back to FIG. 3, the desired ROC signal is compared with the actual ROC signal at summer 320, which responsively produces an ROC error signal. The ROC error signal is filtered by deadband filter 325, then the result is multiplied by a first preselected coefficient value, $K_L$, at 330.

The control continues to the block 335, where a well known proportional plus integral feedback controller modifies the magnitude of the ROC error signal and produces a PI ROC signal. The PI ROC signal is then modified by adjuster 340. For example, the limited PI ROC signal value will range in values from "0" to "1", where "0" represents a small engine load and "1" represents a large engine load. The result of the adjuster 340 is a signal representing the load control coefficient, $K_{UF}$.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The operation of the present invention is now described to illustrate the features and advantages associated with the present invention.

The present invention is adapted to utilized for any work machine that uses a hydrostatic drive for propulsion. One example of a work machine that uses a hydrostatic drive is shown in relation to FIG. 5, which illustrates the hydrostatic drive system 500 of a vibratory soil compactor 505. An engine 510 provides rotation motion to a propel pump 515 which produces highly pressurized fluid to a drum drive motor 520 and wheel drive motor 525. Note that, although one pump is shown, the present invention is equally applicable to a two pump system.

The present invention determines if the engine is stalling, and responsively destrokes the pump to reduce engine load and allow the engine speed to return to the desired speed. Moreover, the present invention determines if the engine speed is over-speeding, and responsively strokes the pump to increase the engine load and allow the engine speed to return to the desired speed. Consequently, the present invention is utilized to maximize engine operating efficiency.

More specifically, in response to the engine decelerating, the controller 145 uses aggressive values to reduce the engine load when the actual engine speed is less than the desired engine speed, and moderate values to increase the engine load when the actual engine speed is greater than the desired engine speed. Contrastingly, in response to the engine accelerating, the controller uses moderate values to reduce the engine load when the actual engine speed is less than the desired engine speed, and aggressive values to increase the engine load when the actual engine speed is greater than the desired engine speed.

Finally, the controller 145 operates on engine acceleration, as opposed to engine speed, to provide the closed-loop control with quick responsiveness to improve system stability.

Other aspects, objects and advantages of the present invention can be obtained from a study of the drawings, the disclosure and the appended claims.

We claim:

1. An apparatus for controlling a load of an engine associated with an hydrostatic drive system, comprising:

a variable displacement pump rotatably driven by the engine;

means for sensing the rotational speed of the engine and producing an actual engine speed signal indicative of the rotational engine speed;

means for producing a desired engine speed signal indicative of a desired rotational speed of the engine;

means for producing a pump command signal indicative of a desired pump displacement;

means for receiving the actual and desired engine speed signals, determining a load control coefficient responsive to the difference between the actual and desired engine speed signals, and responsively modifying the pump command signal, said means for receiving the actual and desired engine speed signals comprising means for determining the acceleration of the engine speed, and producing an actual rate of change signal indicative of the engine speed acceleration; means for comparing the desired and actual engine speed signals, and producing a speed error signal indicative of the difference between the desired and actual engine speed signal magnitudes; means for receiving the actual rate of change and speed error signals, determining a desired rate of change of the engine speed, and responsively producing a desired rate of change signal; means for receiving and comparing the desired and actual rate of change signals, and producing a rate of change error signal indicative of the difference between the desired and actual rate of change signal magnitudes; means for receiving the rate of change error signal, and multiplying the rate of change error signal by a preselected coefficient value: and means for receiving the multiplied rate of change error signal, modifying the rate of change error signal, and responsively determining the load control coefficient value; and means for receiving the modified pump command signal and responsively controlling the variable pump displacement to regulate the engine load.

2. An apparatus, as set forth in claim 1, wherein the pump command signal producing means includes:

means for producing a desired travel speed signal that is indicative of a desired travel speed of the machine;

means for producing an attenuation signal indicative of desired attenuation of the machine travel speed; and means for receiving the desired travel speed and attenuation signals, and responsively producing the pump command signal by taking the product between the desired travel speed and attenuation signal magnitudes.

3. A method for controlling a load of an engine associated with an hydrostatic drive system, the hydrostatic drive system includes a variable displacement pump rotatably driven by the engine, comprising:

sensing the rotational speed of the engine and producing an actual engine speed signal indicative of the rotational engine speed;

producing a desired engine speed signal indicative of a desired rotational speed of the engine;

producing a pump command signal indicative of a desired pump displacement;

receiving the actual and desired engine speed signals, determining a load control coefficient responsive to the difference between the actual and desired engine speed signals, and responsively modifying the pump command signal, said stem of receiving the actual and desired engine speed signals including the steps of determining the acceleration of the engine speed, and producing an actual rate of change signal indicative of the engine speed acceleration; comparing the desired and actual engine speed signals, and producing a speed error signal indicative of the difference between the desired and actual engine speed signal magnitudes; receiving the actual rate of change and speed error signals, determining a desired rate of change of the engine speed, and responsively producing a desired rate of change signal; receiving and comparing the desired and actual rate of change signals, and producing a rate of change error signal indicative of the difference between the desired and actual rate of change signal magnitudes; receiving the rate of change error signal, and multiplying the rate of change error signal by a preselected coefficient value; and receiving the multiplied rate of change error signal, modifying the rate of change error signal, and responsively determining the load control coefficient value; and responsively modifying the pump command signal; and receiving the modified pump command signal and responsively controlling the variable pump displacement to regulate the engine load.

4. A method, as set forth in claim 3, including the steps of:

producing a desired travel speed signal that is indicative of a desired travel speed of the machine;

producing an attenuation signal indicative of desired attenuation of the machine travel speed; and receiving the desired travel speed and attenuation signals, and responsively producing the pump command signal by taking the product between the desired travel speed and attenuation signal magnitudes.

* * * * *